(12) United States Patent
Bhatia et al.

(10) Patent No.: US 11,068,424 B2
(45) Date of Patent: Jul. 20, 2021

(54) ENABLEMENT OF SOFTWARE DEFINED STORAGE SOLUTION FOR NVME OVER ETHERNET FABRIC MANAGEMENT ON A PROCESSOR

(71) Applicant: American Megatrends International, LLC, Duluth, GA (US)

(72) Inventors: Anurag Bhatia, Sugar Hill, GA (US); Jason Messer, Duluth, GA (US); Sanjoy Maity, Snellville, GA (US)

(73) Assignee: AMERICAN MEGATRENDS INTERNATIONAL, LLC, Duluth, GA (US)

( * ) Notice: Subject to any disclaimer, the term of this patent is extended or adjusted under 35 U.S.C. 154(b) by 0 days.

(21) Appl. No.: 16/781,082

(22) Filed: Feb. 4, 2020

(65) Prior Publication Data

US 2020/0252305 A1 Aug. 6, 2020

Related U.S. Application Data

(60) Provisional application No. 62/800,949, filed on Feb. 4, 2019.

(51) Int. Cl.
*G06F 13/362* (2006.01)
*G06F 3/06* (2006.01)
(Continued)

(52) U.S. Cl.
CPC ............ *G06F 13/28* (2013.01); *G06F 3/0607* (2013.01); *G06F 3/067* (2013.01); *G06F 3/0629* (2013.01); *G06F 8/61* (2013.01); *G06F 9/4408* (2013.01); *G06F 9/5077* (2013.01); *G06F 9/542* (2013.01); *G06F 11/1612* (2013.01); *G06F 11/1662* (2013.01); *G06F 11/3031* (2013.01);
(Continued)

(58) Field of Classification Search
None
See application file for complete search history.

(56) References Cited

U.S. PATENT DOCUMENTS 7,424,419 B1 *  9/2008  Fike ...................... G06F 13/385
                                                           703/23
2014/0195657 A1 *  7/2014  Bhatia ................. H04L 43/0817
                                                           709/223

(Continued)

*Primary Examiner* — Joshua Joo
(74) *Attorney, Agent, or Firm* — Locke Lord LLP; Tim Tingkang Xia, Esq.

(57) ABSTRACT

A computer system includes a BMC and a host of the BMC. The BMC receives a first message from a first remote device on a management network. The BMC determines whether the first message is directed to a storage service or fabric service executed on a central processing unit of the host. The host is a storage device. The central processing unit is in commutation with a RDMA controller through an external communication channel. The RDMA controller being managed by the storage service. The BMC extracts a service management command from the first message, when the first message is directed to the storage service or fabric service. The BMC sends, through a BMC communication channel to the host, a second message containing the service management command to the host. The BMC communication channel has been established for communicating baseboard management commands between the BMC and the host.

20 Claims, 9 Drawing Sheets

(51) Int. Cl.

| | |
|---|---|
| *G06F 15/173* | (2006.01) |
| *G06F 13/28* | (2006.01) |
| *H04L 29/08* | (2006.01) |
| *G06F 9/50* | (2006.01) |
| *G06F 11/30* | (2006.01) |
| *G06F 9/54* | (2006.01) |
| *G06F 11/16* | (2006.01) |
| *H04L 12/26* | (2006.01) |
| *G06F 13/42* | (2006.01) |
| *H04L 12/24* | (2006.01) |
| *G06F 8/61* | (2018.01) |
| *G06F 9/4401* | (2018.01) |

(52) U.S. Cl.
CPC ........ *G06F 11/3034* (2013.01); *G06F 13/362* (2013.01); *G06F 13/4221* (2013.01); *G06F 13/4282* (2013.01); *G06F 15/17331* (2013.01); *H04L 41/0213* (2013.01); *H04L 41/32* (2013.01); *H04L 41/5054* (2013.01); *H04L 43/0817* (2013.01); *H04L 43/10* (2013.01); *H04L 67/1097* (2013.01); *G06F 2213/0026* (2013.01); *G06F 2213/28* (2013.01)

(56) References Cited

U.S. PATENT DOCUMENTS

| | | | |
|---|---|---|---|
| 2015/0331694 A1* | 11/2015 | Balakrishnan | G06F 9/4401 713/2 |
| 2016/0127167 A1* | 5/2016 | Chou | H04L 41/0226 709/223 |
| 2017/0034268 A1* | 2/2017 | Govind | G06F 16/172 |
| 2017/0070590 A1* | 3/2017 | Balakrishnan | G06F 3/067 |
| 2019/0377496 A1* | 12/2019 | Olarig | G06F 3/0604 |

* cited by examiner

ENABLEMENT OF SOFTWARE DEFINED STORAGE SOLUTION FOR NVME OVER ETHERNET FABRIC MANAGEMENT ON A PROCESSOR

CROSS-REFERENCE TO RELATED APPLICATION(S)

This application claims the benefits of U.S. Provisional Application Ser. No. 62/800,949, entitled "COMMON 'SERVER SAN' CORE SOLUTION TO ENABLE SOFTWARE DEFINED STORAGE FOR NVME OVER ETHERNET FABRIC ON ALL TYPES OF STORAGE BOXES (SERVERS AND APPLIANCES)" and filed on Feb. 4, 2019, which is expressly incorporated by reference herein in their entirety.

BACKGROUND

Field

The present disclosure relates generally to computer systems, and more particularly, to techniques of enabling software defined storage (e.g., "Server SAN") solution for NVME over Ethernet Fabric management on a commodity/white-box storage server.

Background

The statements in this section merely provide background information related to the present disclosure and may not constitute prior art.

Technological advancements in networking have enabled the rise in use of pooled and/or configurable computing resources. These pooled and/or configurable computing resources may include physical infrastructure for cloud computing networks. The physical infrastructure may include one or more computing systems having processors, memory, storage, networking, etc. Management entities of these cloud computing networks may allocate portions of pooled and/or configurable computing resources in order to place or compose a node (machine or server) to implement, execute or run a workload. Various types of applications or application workloads may utilize this allocated infrastructure in a shared manner via access to these placed or composed nodes or servers.

In the modern age of resource sharing technology (e.g., cloud), pooled storage resources are expected to be large in volumes and are expected to demonstrate the same or a near level of performance as in locally attached storage resource. At the same time, these storage resources are to be distributed/shared dynamically across number of users or applications, as infrastructure needs change. It is expected to achieve the fundamental goal of optimizing the usage of available resources yet delivering the same level of functionality as one would expect with dedicated set of resources.

To ensure that the available storage pool is efficiently distributed/shared across the needs, efficient management of these storage resources is extremely crucial. Newer storage technologies such as NVME enables faster drive performances even when the storage resources are present remotely. Directly Attached Storage (DAS) (e.g., NVME) also provides newer ways to manage the storage in an efficient manner.

Thus, there is a need for a mechanism that targets the standard, commodity NVME storage servers available as white boxes. There is also a need for a mechanism that converts readily available hardware boxes into powerful, and highly efficient "Server SAN" targets and that enables NVMEoEF based software defined storage manageability.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and a computer system are provided. The computer system includes a BMC and a host of the BMC. The BMC receives a first message from a first remote device on a management network. The BMC determines whether the first message is directed to a storage service or fabric service executed on a central processing unit of the host. The host is a storage device. The central processing unit is in commutation with a Remote Direct Memory Access (RDMA) controller through an external communication channel. The RDMA controller being managed by the storage service. The BMC extracts a service management command from the first message, when the first message is directed to the storage service or fabric service. The BMC sends, through a BMC communication channel to the host, a second message containing the service management command to the host. The BMC communication channel has been established for communicating baseboard management commands between the BMC and the host.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
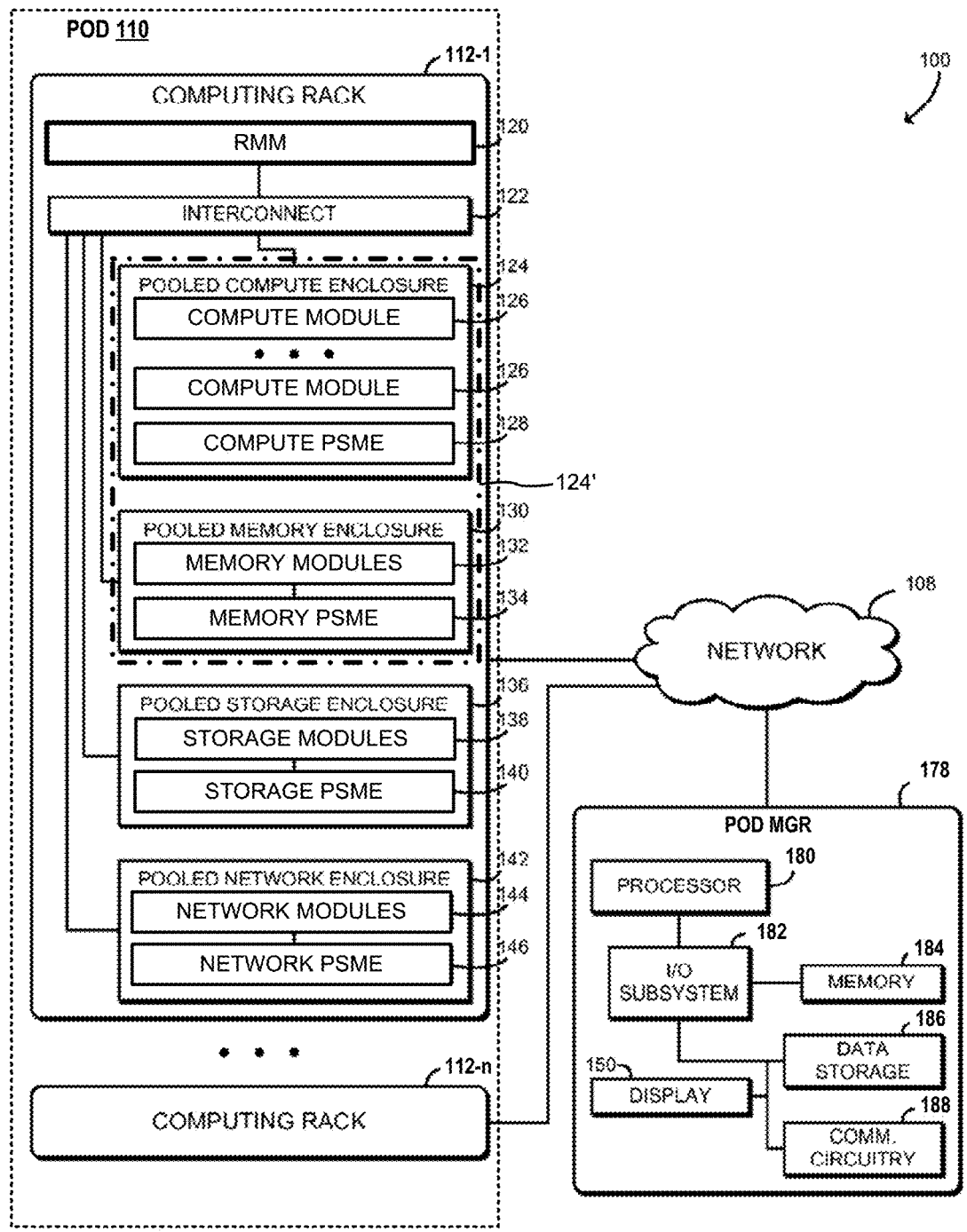
FIG. 1 is a diagram illustrating a computer system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as elements). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating a system 100 including computing racks 112-1 to 112-k and a pod manager 178 in communication over a network 108. The computing racks 112-1 to 112-k collectively constitute a computing pod 110, which is managed by the pod manager 178 as described infra. In general, a pod is a collection of computing racks within a shared infrastructure domain.

In use, computing applications or other workloads may be distributed over any number of the computing racks 112-1 to 112-k using available computing elements of the system 100 (e.g., compute nodes, memory, storage, or networking). The pod manager 178 manages resources of the system 100, for example including the current distribution and scheduling of workloads among the computing elements of the computing racks 112-1 to 112-k. The pod manager 178 can translate human input received into a number of machine-readable user-defined optimization rules. The pod manager 178 can optimize workload of the computing racks 112-1 to 112-k (e.g., optimize the placement and/or scheduling of workloads among the computing elements of the system 100) using the user-defined optimization rules well as predefined goals and constraints.

The system 100 may allow improved scheduling and placement of workload in a highly heterogeneous (e.g., disaggregated and/or modular) datacenter environment, with multiple internal (e.g., efficiency) and/or external (e.g., service delivery objective) constraints. Additionally, the system 100 may enable service providers to offer a wide range of service levels and templates to customers, due to the service provider's ability to optimally profit from all computing elements of the system 100 while managing operational cost tightly. Additionally, although described as being performed by the pod manager 178, in certain configurations some or all of those functions may be performed by other elements of the system 100, such as one or more computing racks 112-1 to 112-k.

Each of the computing racks 112-1 to 112-k may be embodied as a modular computing device that, alone or in combination with other computing racks 112-1 to 112-k, is capable of performing the functions described herein. For example, the computing rack 112-1 may be embodied as a chassis for rack-mounting modular computing units such as compute drawer/trays, storage drawer/trays, network drawer/trays, and/or traditional rack-mounted components such as servers or switches.

In this example, each of the computing racks 112-1 to 112-k may include a RMM 120 (rack management module) and one or more of an interconnect 122 coupled to a pooled compute enclosure 124, a pooled memory enclosure 130, a pooled storage enclosure 136, and a pooled network enclosure 142. The RMM 120 is responsible for managing the rack, which may include assigning IDs for pooled system management engines (PSMEs) and managing the rack power and cooling. Of course, each of the computing racks 112-1 to 112-k may include other or additional components, such as those commonly found in a server device (e.g., power distribution systems, cooling systems, or various input/output devices), in other embodiments.

In certain configurations, each of the pooled compute enclosure 124, the pooled memory enclosure 130, the pooled storage enclosure 136, and the pooled network enclosure 142 may be embodied as a tray, expansion board, or any other form factor, and may be further referred to as a "drawer." In such configurations, each enclosure/drawer may include any number of function modules or computing components, which may be allocated to an application or workload. As each of the computing racks 112-1 to 112-k includes drawers, individual components may be replaced or upgraded and may be "hot swappable." For example, in certain configurations, the pooled compute enclosure 124 may be embodied as a CPU tray including one or more compute modules 126. Each compute module 126 may include a blade having multiple processors and/or processing/controlling circuits. In such configurations, additional processing power may be added to the computing rack 112-1 by swapping out the pooled compute enclosure 124 with another pooled compute enclosure 124 including newer and/or more powerful processors.

The pooled compute enclosure 124 may be embodied as any modular computing unit such as a compute tray, expansion board, chassis, or other modular unit. As described supra, the pooled compute enclosure 124 may include one or more compute modules 126. Each compute module 126 may include a processor blade capable of performing the functions described herein. Each processor blade may include a single or multi-core processor(s), digital signal processor, microcontroller, or other processor or processing/controlling circuit. The compute modules 126 may be heterogeneous; for example, some of the compute modules 126 may be embodied as high-performance server processors and others of the compute modules 126 may be embodied as low-powered processors suitable for higher density deployment.

Further, in certain configurations, the pooled compute enclosure 124 may include a compute PSME 128. The compute PSME 128 may be embodied as any performance counter, performance monitoring unit, or other hardware monitor capable of generating, measuring, or otherwise capturing performance metrics of the compute modules 126 and/or other components of the pooled compute enclosure 124.

The pooled memory enclosure 130 may be embodied as any modular memory unit such as a memory tray, expansion board, chassis, or other modular unit. The pooled memory enclosure 130 includes memory modules 132. Each of the memory modules 132 may have a memory blade containing one or more memories capable of being partitioned, allocated, or otherwise assigned for use by one or more of the compute modules 126 of the pooled compute enclosure 124. For example, the memory blade may contain a pooled memory controller coupled to volatile or non-volatile memory, such as a large number of conventional RAM DIMMs. In operation, the pooled memory enclosure 130 may store various data and software used during operation of the computing rack 112-1 such as operating systems, virtual machine monitors, and user workloads.

Further, in certain configurations, the pooled memory enclosure 130 may include a memory PSME 134. The memory PSME 134 may be embodied as any performance counter, performance monitoring unit, or other hardware monitor capable of generating, measuring, or otherwise capturing performance metrics of the memory modules 132 and/or other components of the pooled memory enclosure 130.

In certain configurations, the computing rack 112-1 may not have a separate pooled memory enclosure 130. Rather, the pooled memory enclosure 130 may be incorporated into the pooled compute enclosure 124. As such, the computing rack 112-1 includes a combined pooled compute enclosure 124' that contains both processors and memories. In particular, in one configuration, a compute module 126 of the combined pooled compute enclosure 124' may include both processors and memories that function together. Accordingly, the compute PSME 128 manages both the processor resources and the memory resources. In another configuration, the combined pooled compute enclosure 124' may include one or more compute modules 126 as well as one or more memory modules 132.

Similarly, the pooled storage enclosure 136 may be embodied as any modular storage unit such as a storage tray, expansion board, chassis, or other modular unit. The pooled storage enclosure 136 includes storage modules 138. Each of the storage modules 138 may have a storage blade containing any type of data storage capable of being partitioned, allocated, or otherwise assigned for use by one or more of the compute modules 126 of the combined pooled compute enclosure 124'. For example, the storage blade may contain one or more memory devices and circuits, memory cards, hard disk drives, solid-state drives, or other data storage devices. Further, the storage modules 138 may be configured to store one or more operating systems to be initialized and/or executed by the computing rack 112-1.

Further, in certain configurations, the pooled storage enclosure 136 may include a storage PSME 140. The storage PSME 140 may be embodied as any performance counter, performance monitoring unit, or other hardware monitor capable of generating, measuring, or otherwise capturing performance metrics of the storage modules 138 and/or other components of the pooled storage enclosure 136.

Similarly, the pooled network enclosure 142 may be embodied as any modular network unit such as a network tray, expansion board, chassis, or other modular unit. The pooled network enclosure 142 includes network modules 144. Each of the network modules 144 may have a blade containing any communication circuit, device, or collection thereof, capable of being partitioned, allocated, or otherwise assigned for use by one or more of the compute modules 126 of the combined pooled compute enclosure 124'. For example, the network blade may contain any number of network interface ports, cards, or switches. In certain configurations, the network modules 144 may be capable of operating in a software-defined network (SDN). The network modules 144 may be configured to use any one or more communication technology (e.g., wired or wireless communications) and associated protocols (e.g., Ethernet, Bluetooth®, Wi-Fi®, WiMAX, etc.) to effect such communication.

Further, in certain configurations, the pooled network enclosure 142 may include a network PSME 146. The network PSME 146 may be embodied as any performance counter, performance monitoring unit, or other hardware monitor capable of generating, measuring, or otherwise capturing performance metrics of the network modules 144 and/or other components of the pooled network enclosure 142.

In certain configurations, the combined pooled compute enclosure 124', the pooled storage enclosure 136, and the pooled network enclosure 142 are coupled to each other and to other computing racks 112-1 to 112-$k$ through the interconnect 122. The interconnect 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate data transfer between the computing elements of the computing rack 112-1. For example, in certain configurations, the interconnect 122 may be embodied as or include a silicon photonics switch fabric and a number of optical interconnects. Additionally or alternatively, in certain configurations, the interconnect 122 may be embodied as or include a top-of-rack switch.

The RMM 120 may be implemented by any computing node, micro-controller, or other computing device capable of performing workload management and orchestration functions for the computing rack 112-1 and otherwise performing the functions described herein. For example, the RMM 120 may be embodied as one or more computer servers, embedded computing devices, managed network devices, managed switches, or other computation devices. In certain configurations, the RMM 120 may be incorporated or otherwise combined with the interconnect 122, for example in a top-of-rack switch.

As described supra, in certain configurations, the system 100 may include a pod manager 178. A pod manager 178 is configured to provide an interface for a user to orchestrate, administer, or otherwise manage the system 100. The pod manager 178 may be embodied as any type of computation or computer device capable of performing the functions described herein, including, without limitation, a computer, a multiprocessor system, a server, a rack-mounted server, a blade server, a laptop computer, a notebook computer, a tablet computer, a wearable computing device, a network appliance, a web appliance, a distributed computing system, a processor-based system, and/or a consumer electronic device. In certain configurations, the pod manager 178 may be embodied as a distributed system, for example with some or all computational functions performed by the computing racks 112-1 to 112-k and with user interface functions performed by the pod manager 178. Accordingly, although the pod manager 178 is illustrated in FIG. 1 as embodied as a single server computing device, it should be appreciated that the pod manager 178 may be embodied as multiple devices cooperating together to facilitate the functionality described infra. As shown in FIG. 1, the pod manager 178 illustratively includes a processor 180, an input/output subsystem 182, a memory 184, a data storage device 186, and communication circuitry 188. Of course, the pod manager 178 may include other or additional components, such as those commonly found in a workstation (e.g., various input/output devices), in other embodiments. Additionally, in certain configurations, one or more of the illustrative components may be incorporated in, or otherwise form a portion of, another component. For example, the memory 184, or portions thereof, may be incorporated in the processor 180 in certain configurations.

The processor 180 may be embodied as any type of processor capable of performing the functions described herein. The processor 180 may be embodied as a single or multi-core processor(s), digital signal processor, micro-controller, or other processor or processing/controlling circuit. Similarly, the memory 184 may be embodied as any type of volatile or non-volatile memory or data storage capable of performing the functions described herein. In operation, the memory 184 may store various data and software used during operation of the pod manager 178 such as operating systems, applications, programs, libraries, and drivers. The memory 184 is communicatively coupled to the processor 180 via the I/O subsystem 182, which may be embodied as circuitry and/or components to facilitate input/output operations with the processor 180, the memory 184, and other components of the pod manager 178. For example, the I/O subsystem 182 may be embodied as, or otherwise include, memory controller hubs, input/output control hubs, integrated sensor hubs, firmware devices, communication links (i.e., point-to-point links, bus links, wires, cables, light guides, printed circuit board traces, etc.) and/or other components and subsystems to facilitate the input/output operations. In certain configurations, the I/O subsystem 182 may form a portion of a system-on-a-chip (SoC) and be incorporated, along with the processor 180, the memory 184, and other components of the pod manager 178, on a single integrated circuit chip.

The data storage device 186 may be embodied as any type of device or devices configured for short-term or long-term storage of data such as, for example, memory devices and circuits, memory cards, hard disk drives, solid-state drives, or other data storage devices. The communication circuitry 188 of the pod manager 178 may be embodied as any communication circuit, device, or collection thereof, capable of enabling communications between the pod manager 178, the computing racks 112-1 to 112-k, and/or other remote devices over the network 108. The communication circuitry 188 may be configured to use any one or more communication technology (e.g., wired or wireless communications) and associated protocols (e.g., Ethernet, Bluetooth®, Wi-Fi®, WiMAX, etc.) to effect such communication.

The pod manager 178 further includes a display 190. The display 190 of the pod manager 178 may be embodied as any type of display capable of displaying digital information such as a liquid crystal display (LCD), a light emitting diode (LED), a plasma display, a cathode ray tube (CRT), or other type of display device. As further described below, the display 190 may present an interactive graphical user interface for management of the system 100.

As described infra, the computing racks 112-1 to 112-k and the pod manager 178 may be configured to transmit and receive data with each other and/or other devices of the system 100 over the network 108. The network 108 may be embodied as any number of various wired and/or wireless networks. For example, the network 108 may be embodied as, or otherwise include, a wired or wireless local area network (LAN), a wired or wireless wide area network (WAN), a cellular network, and/or a publicly-accessible, global network such as the Internet. As such, the network 108 may include any number of additional devices, such as additional computers, routers, and switches, to facilitate communications among the devices of the system 100.

Although each of the computing racks 112-1 to 112-k has been illustrated as including a single combined pooled compute enclosure 124', a single pooled storage enclosure 136, and a single pooled network enclosure 142, it should be understood that each of the computing racks 112-1 to 112-k may include any number and/or combination of those modular enclosures.

Figure 2:
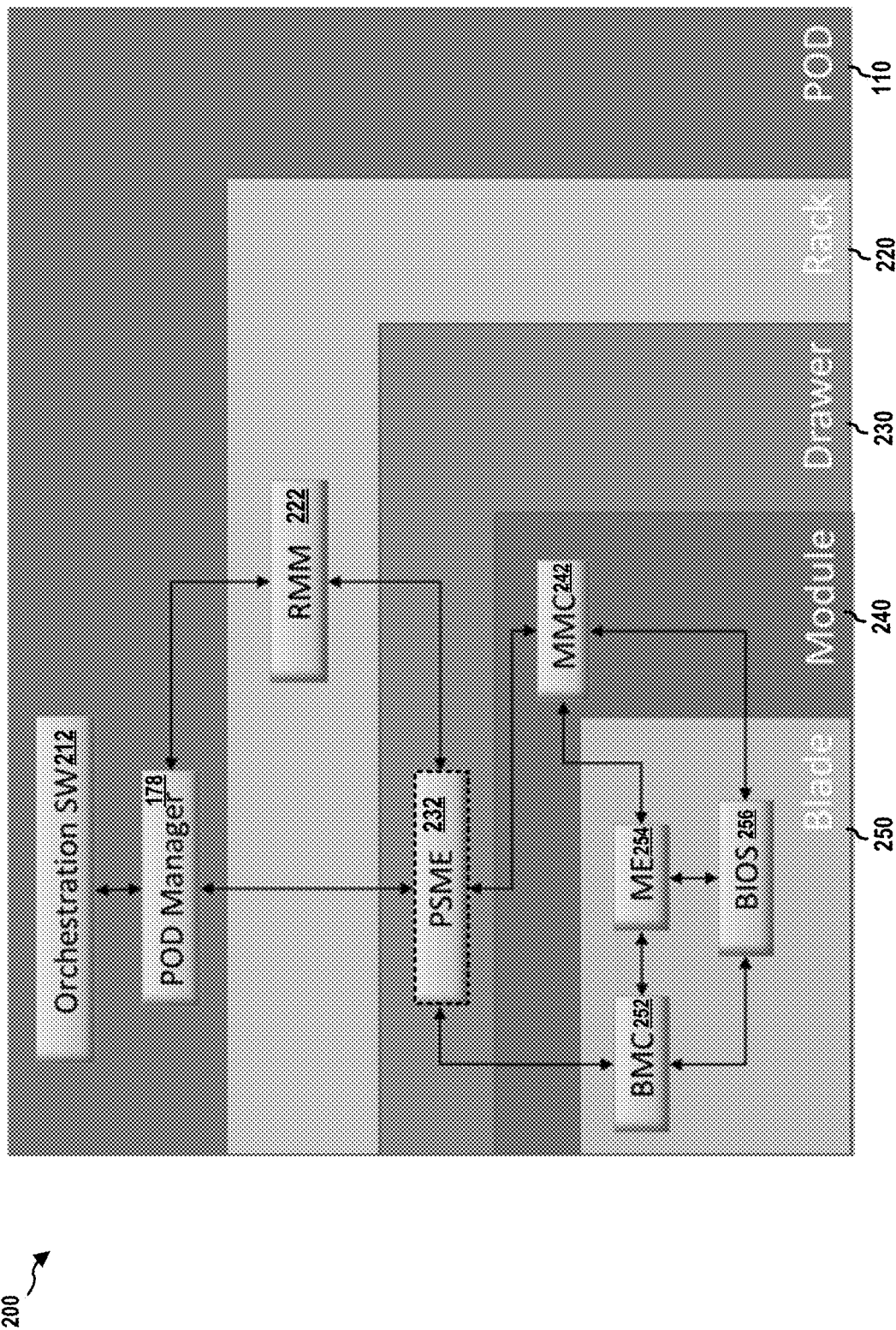
FIG. 2 is a diagram illustrating a logical hierarchy of a computer system.

FIG. 2 is a diagram 200 illustrating a logical hierarchy of the system 100. As described supra, the pod manager 178 manages the computing pod 110. An orchestration module 212 may send a request to the pod manager 178 for a composed-node. Accordingly, the pod manager 178 may allocate resources of the computing pod 110 to build the requested composed-node. A composed-node may include resources from compute, memory, network, and storage modules.

Further, as shown, the computing pod 110 includes at least one computing rack 220. Each computing rack 220, which may be any one of the computing racks 112-1 to 112-k, includes a RMM 222 (e.g., the RMM 120). The computing rack 220 also includes at least one computing drawer 230, each of which may be any one of the combined pooled compute enclosure 124', the pooled storage enclosure 136, and the pooled network enclosure 142. In certain configurations, each computing drawer 230 may include a PSME 232, which may be any corresponding one of the compute PSME 128, the memory PSME 134, the storage PSME 140, and the network PSME 146.

The computing drawer 230 also includes at least one module 240, which may be any corresponding one of the compute module 126, the memory module 132, the storage module 138, and the network module 144. Each module 240 includes a MMC 242 (module management controller) that services the module 240 and manages the blades in the module 240.

Each module 240 also includes at least one computing blade 250. Each computing blade 250 includes a BMC 252 (baseboard management controller), a ME 254 (management engine), and a BIOS 256 (Basic Input/Output System). The PSME 232 is in communication with the MMC 242 and the BMC 252. The BMC 252 is in communication with the BIOS 256 and the ME 254.

In particular, the pod manager 178 is responsible for discovery of resources in the computing pod 110, configuring the resources, power and reset control, power management, fault management, monitoring the resources usage. The pod manager 178 interacts with the RMM 120 and the PSME 232 to create representation of the computing pod 110. The pod manager 178 allows composing a physical node to match the logical node requirements specified by the solution stack. Such composition is able to specify a system at a sub-composed node granularity.

The pod manager 178 may be connected to the RMM 222 and the PSME 232 through the network 108 (e.g., a private network). A management related activity such as reconfiguration may be performed after establishing a secure communication channel between the pod manager 178 and the PSME 232 and between the pod manager 178 and the RMM 222.

The RMM 222 may be responsible for handling infrastructure functions of the computing rack 220 such as power, cooling, and assigning PSME IDs. The RMM 222 may also support power monitoring at rack level. This feature helps the pod manager 178 take actions to keep the rack within its power budget.

As described supra, the computing rack 220 is made-up of drawers such as the computing drawer 230. The computing rack 220 provides a mechanism to manage rack level end point components down to the drawer level. In particular, the PSME 232 provides management interface to manage the modules/blades (e.g., the module 240/the computing blade 250) at a drawer level. In certain configurations, the PSME 232 may service multiple drawers, as long as the drawer is uniquely addressable and provides the necessary instrumentation. For example, if each drawer has a microcontroller to provide the necessary instrumentation for all drawer requirements (such as module presence detection) and is interfaced to the RMM 222, then the PSME 232 could physically run in the RMM 222 and represent each drawer instance.

In certain configurations, the PSME 232 may be responsible for drawer identification management and for communicating with the BMC 252 and the MMC 242 perform node-level management. If the RMM 222 is not present in the computing rack 220, the PSME 232 in the computing rack 220 would provide the RMM functionality. The PSME 232 may also provide individual node reset support including power on and power off of the drawer and modules (e.g., the module 240 and the computing blade 250) that are managed by the PSME 232.

Figure 3:
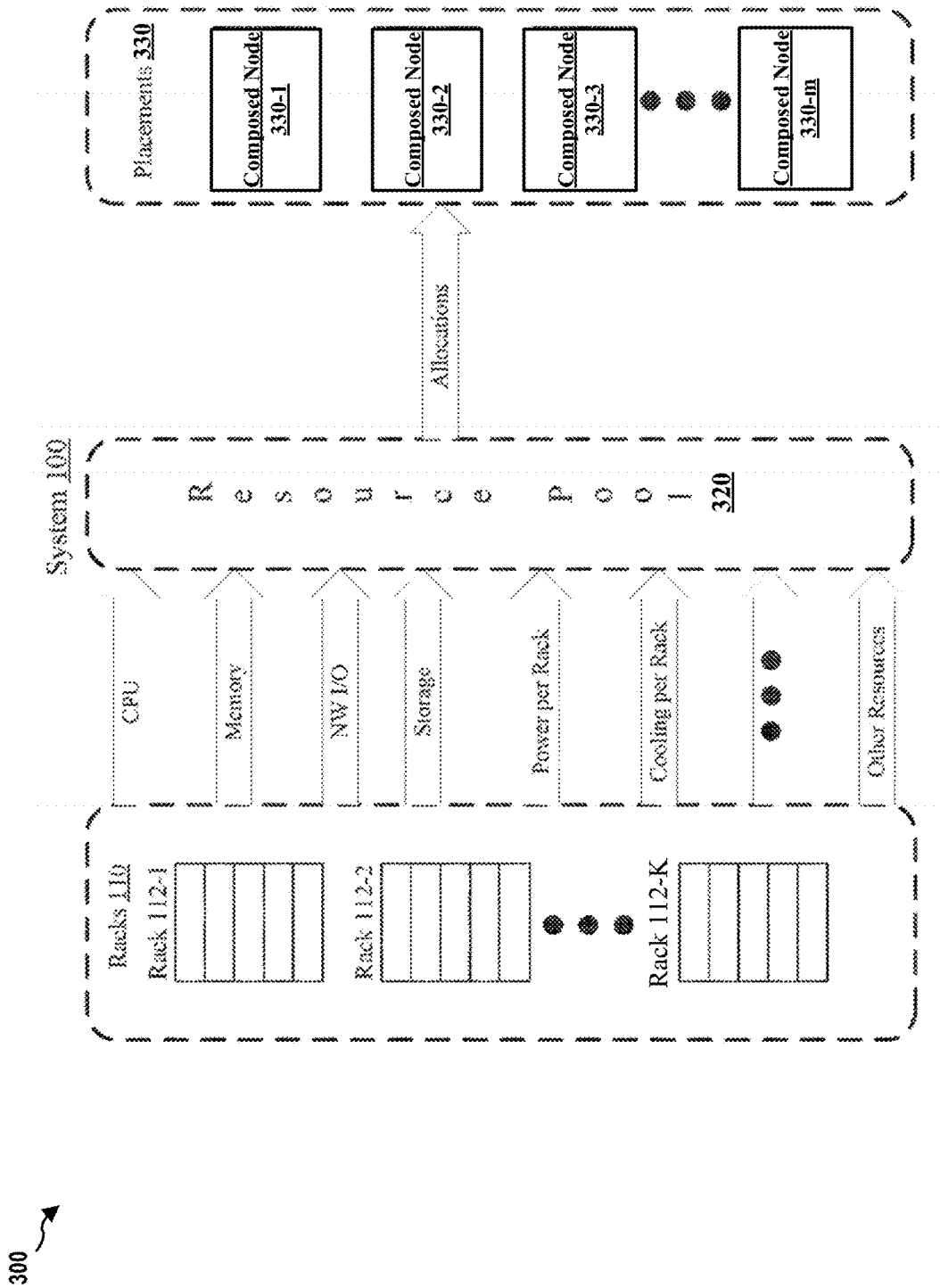
FIG. 3 is a diagram illustrating allocation of resources of a computer system.

FIG. 3 is a diagram 300 illustrating allocation of resources of the system 100. In certain configurations, as described supra, machines (or servers) can be logically composed from pools of disaggregated physical elements of the system 100 to implement or execute incoming workload requests. These composed-nodes may be deployed in large data centers. The composed-nodes may also be part of software defined infrastructure (SDI). SDI-enabled data centers may include dynamically composed-nodes to implement or execute workloads.

As described supra, the system 100 may include the computing racks 112-1 to 112-k, where k is a positive integer. Each rack may include various configurable computing resources. These configurable computing resources may include various types of disaggregated physical elements. Types of disaggregated physical elements may include, but are not limited to, CPU types (e.g., the compute modules 126), memory types (e.g., the memory modules 132), storage types (e.g., the storage modules 138), network I/O types (e.g., the network modules 144), power types (e.g., power bricks), cooling types (e.g., fans or coolant) or other types of resources (e.g., network switch types). These configurable computing resources may be made available (e.g., to a resource manager or controller) in a resource pool 320.

In certain configurations, various configurable computing resources of the system 100 may be made available in the resource pool 320 for allocation to build a composed-node. A composed-node, for example, may be composed to implement or execute a workload. At least a portion (e.g., a configuration) of available configurable computing resources in the resource pool may be allocated to support placements 330. As shown in FIG. 3, placements 330 include composed-nodes 332-1 to 332-m, where "m" is any positive integer.

As described infra, certain logic and/or features of the system 100 may also be capable of monitoring operating attributes for each configurable computing resource allocated to compose or place a composed-node while the composed-node implements, runs or executes a workload.

According to some examples, each of the composed-nodes 332-1 to 332-m may be used to run one or more virtual machines (VMs). For these examples, each of the one or VMs may be allocated a portion of a composed-node (i.e., allocated configurable computing resources). In other examples, a composed-node may be allocated directly to a given VM.

Figure 4:
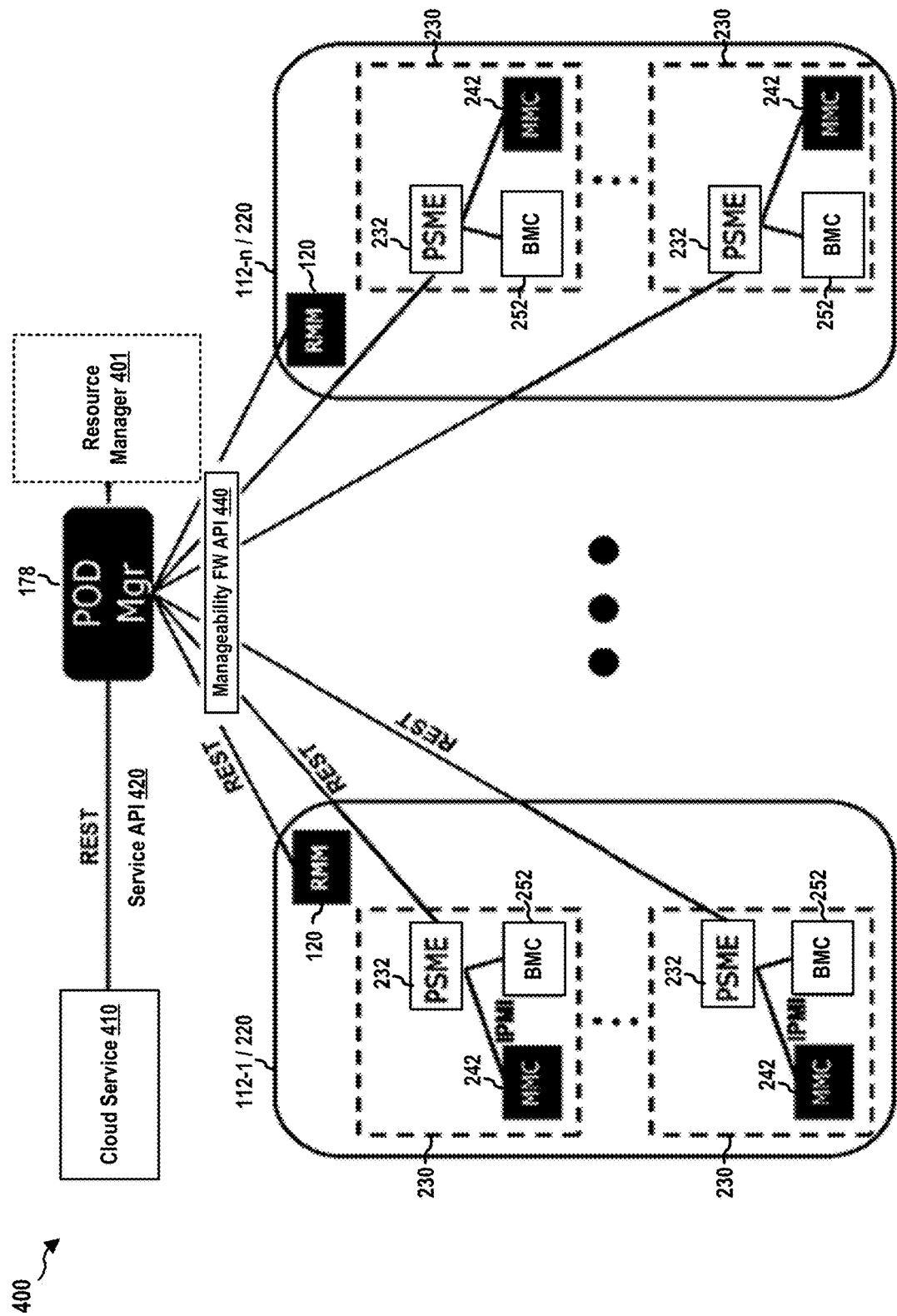
FIG. 4 is a diagram illustrating a rack management structure of a computer system.

FIG. 4 is a diagram illustrating a rack management structure 400 of the system 100. In some examples, as shown in FIG. 4, the rack management structure 400 includes various managers and application programming interfaces (APIs). For example, a cloud service 410 may interface through a service API 420 (e.g., orchestration interface) as a common service application interface (API) to communicate with the pod manager 178. The pod manager 178 manages the computing racks 112-1 to 112-k including various types of disaggregated physical elements (e.g., the computing drawer 230).

In certain configurations, the pod manager 178 may include a resource manager 401 that includes logic and/or features capable of allocating these disaggregated physical elements (e.g., the compute modules 126, the memory modules 132, the storage modules 138, the network modules 144) responsive to a request from a cloud service 410 to allocate configurable computing resources to a composed-node to implement or execute a workload that may be associated with the cloud service 410. The workload, for example, may be an application workload such as, but not limited to, video processing, encryption/decryption, a web server, content delivery or a database. The resource manager 401 may maintain a resource catalog to track what configurable computing resources have been allocated and also what configurable computing resources may be available to allocation responsive to subsequent requests from the cloud service 410.

In certain configurations, the pod manager 178 may utilize a manageability FW API 440 (firmware), which is a Representational State Transfer (REST)—based API, to access to the configurable computing resources at the computing racks 112-1 to 112-k. This access may include access to disaggregated physical elements maintained at racks as well as metadata for technologies deployed in these racks that may include gathered operating attributes for these disaggregated physical elements. In particular, the manageability FW API 440 provides access to the RMM 120 and the PSME 232 (e.g., the compute PSME 128, the memory PSME 134, the storage PSME 140, and the network PSME 146) of each computing drawer 230 in the computing racks 112-1 to 112-$k$.

REST-based or RESTful Web services are one way of providing interoperability between computer systems on the Internet. REST-compliant Web services allow requesting systems to access and manipulate textual representations of Web resources using a uniform and predefined set of stateless operations. In a RESTful Web service, requests made to a resource's URI will elicit a response that may be in XML, HTML, JSON or some other defined format. The response may confirm that some alteration has been made to the stored resource, and it may provide hypertext links to other related resources or collections of resources. Using HTTP, as is most common, the kind of operations available include those predefined by the HTTP verbs GET, POST, PUT, DELETE and so on. By making use of a stateless protocol and standard operations, REST systems aim for fast performance, reliability, and the ability to grow, by re-using components that can be managed and updated without affecting the system as a whole, even while it is running.

In certain configurations, the RMM 120 may also provide access to the physical and logical asset landscapes or mapping in order to expedite identification of available assets and allocate configurable computing resources responsive to requests to compose or place a composed-node to implement or execute a workload.

In certain configurations, the RMM 120 may provide a rack level user interface in order to fulfill several basic functions, such as discovery, reservation, polling, monitoring, scheduling and usage. Also, the RMM 120 may be utilized for assembly of higher order computing resources in a multi-rack architecture (e.g., to execute a workload).

In certain configurations, the RMM 120 may report assets under its management to the pod manager 178 that includes the resource manager 401. For these examples, resource manager 401 may include logic and/or features capable of assisting the pod manager 178 in aggregating an overall physical asset landscape structure from all racks included in the pod of racks managed by the pod manager 178 into a single multi-rack asset. According to some examples, the RMM 120 may also receive and/or respond to requests from the pod manager 178 via the manageability FW API 440 (i.e., a REST API).

According to some examples, the pod manager 178 may receive a request to allocate a portion of the configurable computing resources maintained in the computing racks 112-1 to 112-$k$. For these examples, the pod manager 178 may receive the request through the service API 420 in a standardized protocol format such as the Open Virtualization Format (OVF). OVF may include hints (e.g., metadata) of a type of workload. The pod manager 178 may be capable of determining what hardware configuration may be needed to place or compose a composed-node to implement or execute the workload. The pod manager 178 may then forward the request and indicate the hardware configuration possibly needed to the resource manager 401. For example, a configuration of configurable computing resources including various types of disaggregate physical elements such as CPUs, memory, storage and NW I/O needed to implement, run, or execute the workload. The pod manager 178 may discover and communicate with the RMM 222 of each computing rack 220 and the PSME 232 of each computing drawer 230.

The BMC 252 may support Intelligent Platform Management Interface standard (IPMI). IPMI is an industry standard and is described in, e.g., "IPMI: Intelligent Platform Management Interface Specification, Second Generation, v.2.0, Feb. 12, 2004," which is incorporated herein by reference in its entirety. IPMI defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, simple network management protocol (SNMP) traps, etc. The BMC 252 may be in communication with the computing blade 250 and may manage the computing blade 250.

Further, the PSME 232 may include REST services. The pod manager 178 may access the REST services through the manageability FW API 440. The REST services provide the REST-based interface that allows full management of the PSME 232, including asset discovery and configuration. For example, the REST services may be a REDFISH® server. REDFISH® is an open industry standard specification and schema that specifies a RESTful interface and utilizes JSON and OData for the management of scale-out computing servers and for accessing data defined in model format to perform out-of-band systems management. The REST services may support some or all of the requirements of "Redfish Scalable Platforms Management API Specification, Version: 1.0.0, Document Identifier: DSP0266, Date: 2015 Aug. 4," which is incorporated herein in its entirety by reference.

When the computing drawer 230 is a compute drawer, the PSME 232 may provide to the pod manager 178 information of and functions to operate on a processor collection resource, which provides collection of all processors available in a blade.

When the computing drawer 230 is a memory drawer or a compute drawer including a memory), the PSME 232 may provide to the pod manager 178 information of and functions to operate on a memory collection resource, which provides collection of all memory modules installed in a computer system. The PSME 232 may also provide information of and functions to operate on a memory chunks collection resource, which provides collection of all memory chunks in a computer system. The PSME 232 may further provide to the pod manager 178 information of and functions to operate on a storage adapters collection resource, which provides collection of all storage adapters available in a blade. The PSME 232 may also provide to the pod manager 178 information of and functions to operate on a storage adapter resource, which provides detailed information about a single storage adapter identified by adapter ID. The PSME 232 may provide to the pod manager 178 information of and functions to operate on a storage device collection resource, which provides collection of all storage devices available in a storage adapter. The PSME 232 may also provide to the pod manager 178 information of and functions to operate on a device resource, which provides detailed information about a single storage device identified by device ID.

When the computing drawer 230 is a networking drawer, the PSME 232 may provide to the pod manager 178 information of and functions to operate on a Blade Network Interface resource, which provides detailed information about a network interface identified by NIC ID.

In addition, the PSME 232 may provide to the pod manager 178 information of and functions to operate on a manager collection resource, which provides collection of all managers available in the computing drawer 230. The PSME 232 may provide to the pod manager 178 information of and functions to operate on chassis collection resource, a chassis resource, a computer systems collection, and a computer system resource, The PSME 232 may provide to the pod manager 178 information of and functions to operate on one or more of the following: a manager resource that provides detailed information about a manager identified by manager ID; a switch collection resource that provides collection of all switches available in a fabric module; a switch resource that provides detailed information about a switch identified by switch ID; a switch port collection resource that provides collection of all switch port available in a switch; a switch port resource that provides detailed information about a switch port identified by port ID; a switch ACL collection resource that provides collection of all Access Control List (ACL) defined on switch; a switch ACL resource that provides detailed information about a switch Access Control List defined on switch; a switch ACL rule collection resource that provides collection of all rules for Access Control List (ACL) defined on switch; a switch ACL rule resource that provides detailed information about a switch ACL rule defined identified by rule ID; a switch port static MAC collection resource that provides collection of all static MAC forwarding table entries; a switch port static MAC resource that provides detailed information about a static MAC address forward table entry; a network protocol resource that provides detailed information about all network services supported by a manager identified by manager ID; a Ethernet interface collection resource that provides collection of all Ethernet interfaces supported by a manager identified by manager ID or included in a blade identified by blade ID; a Ethernet interface resource that provides detailed information about a Ethernet interface identified by NIC ID; a VLAN Network Interface collection resource that provides collection of all VLAN network interfaces existing on a switch port identified by port ID or network interface identified by NIC ID; a VLAN Network Interface resource that provides detailed information about a VLAN network interface identified by VLAN ID; an event service resource responsible for sending events to subscribers; an event subscription collection, which is a collection of Event Destination resources; an event subscription contains information about type of events user subscribed for and should be sent; and a definition of event array that is POST-ed by Event Service to active subscribers, event array representing the properties for the events themselves and not subscriptions or any other resource, each event in this array having a set of properties that describe the event.

Dynamic resource allocation and composing of systems are possible with rack scale design (RSD) based implementation. The present disclosure provides feature of displaying availability of the rack based resources at a given point of time. Further, based on the request of an end user, a new system will be composed based on the availability of resources and in an optimal way of uniform distribution of electrical load and thermal load across the racks. The present disclosure provides, among other things, an intelligent device for selecting the available resources based on the current usage and an optimal way of allocation of resources for the benefit of effective system cooling, minimum electrical power loss and low heat dissipation by power distribution equipment.

Figure 5:
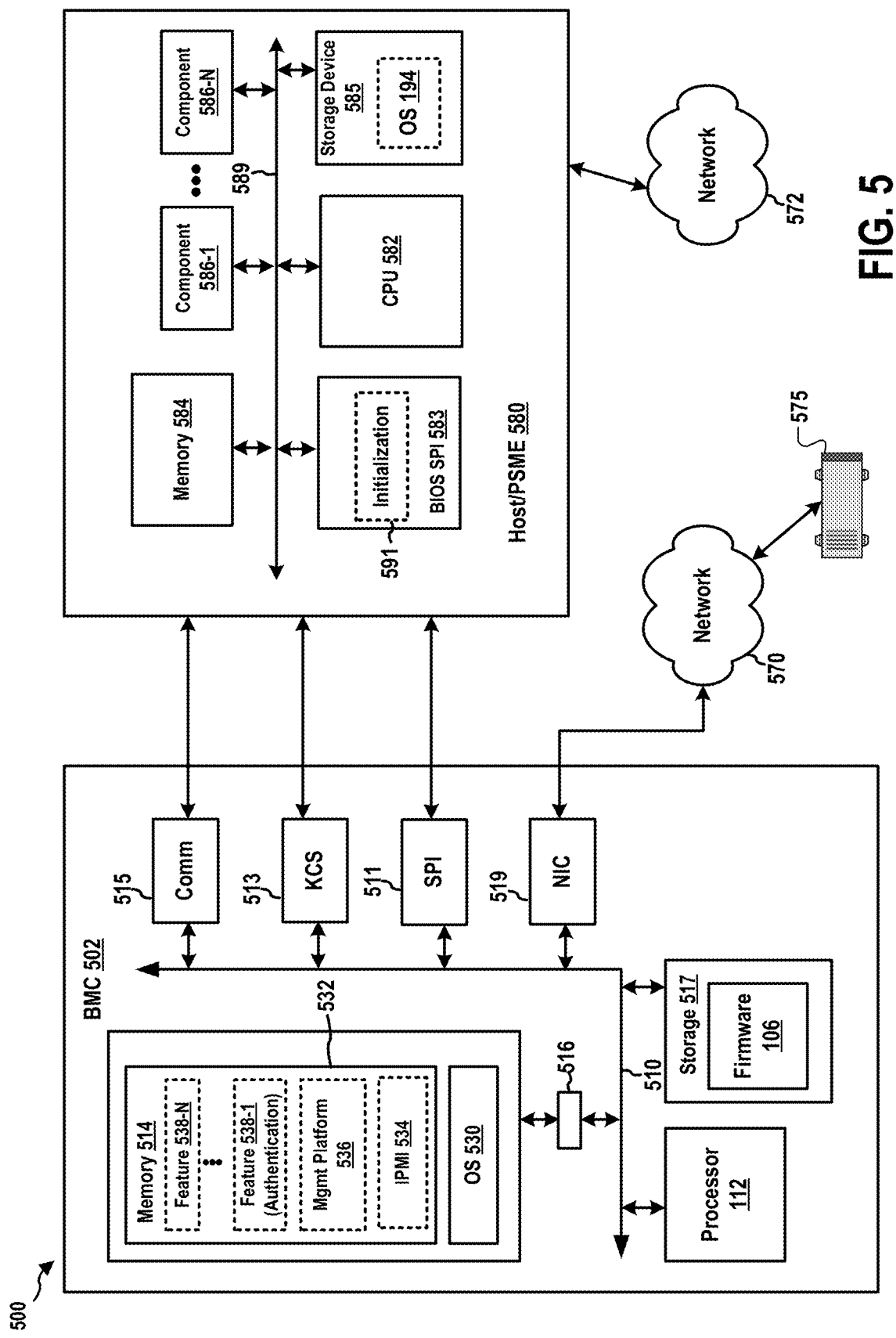
FIG. 5 is a diagram illustrating a computer system.

FIG. 5 is a diagram illustrating a computer system 500. In this example, the computer system includes, among other devices, a BMC 502 and a host computer/PSME 580. The BMC 502 has, among other components, a processing unit 512, a memory 514, a memory driver 516, a storage 517, a SPI interface 511 (Serial Peripheral Interface), a KCS interface 513 (Keyboard Controller Style), a network interface card 519, and other communication interfaces 515.

The communication interfaces 515 may include a Universal Serial Bus (USB) interface, a server management interface chip (SMIC) interface, a block transfer (BT) interface, a system management bus system interface (SSIF), and/or other suitable communication interface(s). Further, as described infra, the BMC 502 supports IPMI and provides an IPMI interface between the BMC 502 and the host computer/PSME 580. The IPMI interface may be implemented over one or more of the KCS interface 513, the network interface card 519, and the communication interfaces 515.

In certain configurations, one or more of the above components may be implemented as a system-on-a-chip (SoC). For examples, the processing unit 512, the memory 514, the memory driver 516, the storage 517, the network interface card 519, the KCS interface 513, the SPI interface 511, and/or the communication interfaces 515 may be on the same chip. In addition, those components may be in communication with each other through a communication channel 510 such as a bus architecture.

The BMC 502 may store BMC firmware 506 in the storage 517. The storage 517 may utilize a non-volatile, non-transitory storage media. When the processing unit 512 executes the BMC firmware 506, the processing unit 512 loads code and data of the BMC firmware 506 into the memory 514. In particular, the BMC firmware 506 can provide in the memory 514 an OS 530 (operating system) and service components 532. The service components 532 include, among other components, IPMI services 534, a management platform 536, and feature components 538-1 to 538-N. Further, the service components 532 may be implemented as a service stack. As such, the BMC firmware 506 can provide an embedded system to the BMC 502. In addition, the storage 517 may provide database(s) 507 that can be accessed by the IPMI services 534 or the management platform 536.

In one example, the management platform 536 may implements REDFISH specification, as defined in "Redfish Scalable Platforms Management API Specification Document Identifier: DSP0266 Date: 2018 Apr. 5 Version: 1.4.1," which is published by Distributed Management Task Force (DMTF) and is expressly incorporated by reference herein in its entirety.

The BMC 502 may be in communication with the host computer/PSME 580 through the KCS interface 513, the network interface card 519, the communication interfaces 515, the SPI interface 511, and/or the IPMI interface.

The host computer/PSME 580 may be the compute PSME 128, the memory PSME 134, the network PSME 146, or the storage PSME 140. The host computer/PSME 580 includes a host CPU 582, a host memory 584, a storage device 585, an initialization storage device 583, and component devices 586-1 to 586-N that may be interconnected with each other through a host bus system 589. Further, the initialization storage device 583 may be a SPI device.

The component devices 586-1 to 586-N can be any suitable type of hardware components that are installed on the host computer/PSME 580, including additional CPUs, memories, and storage devices. As a further example, the component devices 586-1 to 586-N can also include Peripheral Component Interconnect Express (PCIe) devices, a redundant array of independent disks (RAID) controller, and/or a network controller. Further, the component devices 586-1 to 586-N can include hardware components of a computer 702 shown in FIG. 7.

In this example, after the host computer/PSME 580 is powered on, the host CPU 582 loads an initialization service component 591 from the initialization storage device 583 into the host memory 584 and executes the initialization service component 591. In one example, the initialization service component 591 is a basic input/output system (BIOS). In another example, the initialization service component 591 implements a Unified Extensible Firmware Interface (UEFI). UEFI is defined in, for example, "Unified Extensible Firmware Interface Specification Version 2.6, dated January, 2016," which is expressly incorporated by reference herein in their entirety. As such, the initialization service component 591 may include one or more UEFI boot services.

The initialization service component 591, among other things, performs hardware initialization during the booting process (power-on startup). For example, when the initialization service component 591 is a BIOS, the initialization service component 591 can perform a Power On System Test, or Power On Self Test, (POST). The POST is used to initialize the standard system components, such as system timers, system DMA (Direct Memory Access) controllers, system memory controllers, system I/O devices and video hardware (which are part of the component devices 586-1 to 586-N). As part of its initialization routine, the POST sets the default values for a table of interrupt vectors. These default values point to standard interrupt handlers in the memory 514 or a ROM. The POST also performs a reliability test to check that the system hardware, such as the memory and system timers, is functioning correctly. After system initialization and diagnostics, the POST surveys the system for firmware located on non-volatile memory on optional hardware cards (adapters) in the system. This is performed by scanning a specific address space for memory having a given signature. If the signature is found, the initialization service component 591 then initializes the device on which it is located. When the initialization service component 591 includes UEFI boot services, the initialization service component 591 may also perform procedures similar to POST.

After the initialization is performed, the initialization service component 591 can read a bootstrap loader from a predetermined location from a boot device of the storage device 585, usually a hard disk of the storage device 585, into the host memory 584, and passes control to the bootstrap loader. The bootstrap loader then loads an OS 594 into the host memory 584. If the OS 594 is properly loaded into memory, the bootstrap loader passes control to it. Subsequently, the OS 594 initializes and operates. Further, on certain disk-less, or media-less, workstations the adapter firmware located on a network interface card re-routes the pointers used to bootstrap the operating system to download the operating system from an attached network.

The service components 532 of the BMC 502 may manage the host computer/PSME 580 and is responsible for managing and monitoring the server vitals such as temperature and voltage levels. The service stack can also facilitate administrators to remotely access and manage the host computer/PSME 580. In particular, the BMC 502, via the IPMI services 534, may manage the host computer/PSME 580 in accordance with IPMI. The service components 532 may receive and send IPMI messages to the host computer/PSME 580 through the IPMI interface.

Further, the host computer/PSME 580 may be connected to a data network 572. In one example, the host computer/PSME 580 may be a computer system in a data center. Through the data network 572, the host computer/PSME 580 may exchange data with other computer systems in the data center or exchange data with machines on the Internet.

The BMC 502 may be in communication with a communication network 570 (e.g., a local area network (LAN)). In this example, the BMC 502 may be in communication with the communication network 570 through the network interface card 519. Further, the communication network 570 may be isolated from the data network 572 and may be out-of-band to the data network 572. In certain configurations, the communication network 570 may not be connected to the Internet. In certain configurations, the communication network 570 may be in communication with the data network 572 and/or the Internet. In addition, through the communication network 570, a remote device 575 may communicate with the BMC 502. For example, the remote device 575 may send IPMI messages to the BMC 502 over the communication network 570.

In the modern age of cloud/resource sharing technology, like any other technological resource, pooled storage resources are expected to be large in volumes and are expected to demonstrate the same/near level of performance as in locally attached storage resource. At the same time, these storage resources are to be distributed/shared dynamically across number of users or applications, as infrastructure needs change. The is expected to achieve the fundamental goal of optimizing the usage of available resources yet delivering the same level of functionality as one would expect with dedicated set of resources.

To ensure that the available storage pool is efficiently distributed/shared across the needs, efficient management of these storage resources is extremely crucial. Newer storage technologies like non-volatile memory express (NVME) provides faster drive performances, even if the storage resources are present remotely. Directly Attached Storage (DAS) implementing NVME also provides newer ways to manage the storage in an efficient manner. These technologies are applicable for the large-scale cloud installations at data centers, as well as local cloud installations at the enterprise levels.

The techniques disclosed here can be applied to standard, commodity NVME storage servers and storage appliances, e.g., just a bunch of flashes (JBOFs), available as white boxes. Using the techniques, these readily available hardware boxes can be converted into powerful, and highly efficient "Server Storage Area Network (Server SAN)" targets, enabling NVME over Ethernet Fabric (NVMEoEF) based software defined storage manageability, required in a dynamically changing resources infrastructure like cloud installations. In this disclosure, the terms "Server SAN" and "NVMEoEF" may be used interchangeably to represent out-of-band software defined storage (SDS) management of NVME storage devices. Further, the techniques may offer the same set of storage software modules that can be supported by different hardware component such server chips (e.g., of architectures x86, AMD, ARM) or appliance chips (e.g., BROADCOM 5880X, MELLANOX BLUE-FIELD).

The techniques disclosed here may enable "NVME over Ethernet Fabric" function on standard, readily available commodity NVME storage boxes (e.g., servers and appliances). In particular, the techniques disclosed here may be applied to storage boxes, independent of the architecture or external storage controller in use. Hardware changes may not be required in already available storage boxes in order to apply the techniques disclosed here for enabling the "NVME over Ethernet Fabric" functions. Further, applying the techniques should not affect the existing server management functions running on the BMC chip within a storage box.

In the techniques disclosed here, small storage management extensions may be added to the already existing BMC firmware in storage box. These BMC firmware extensions facilitate the connectivity for OOB "NVME over Ethernet Fabric" solution using an already existing network connection to the storage box. There may not be new network connection required to enable out-of-band "Server SAN" capability. The storage management services are installed and executed on the server chipset or the storage controller. In on implementation, these services on a PSME provide fabric and storage service functions as per RSD specification, targeting cloud infrastructure.

Figure 6:
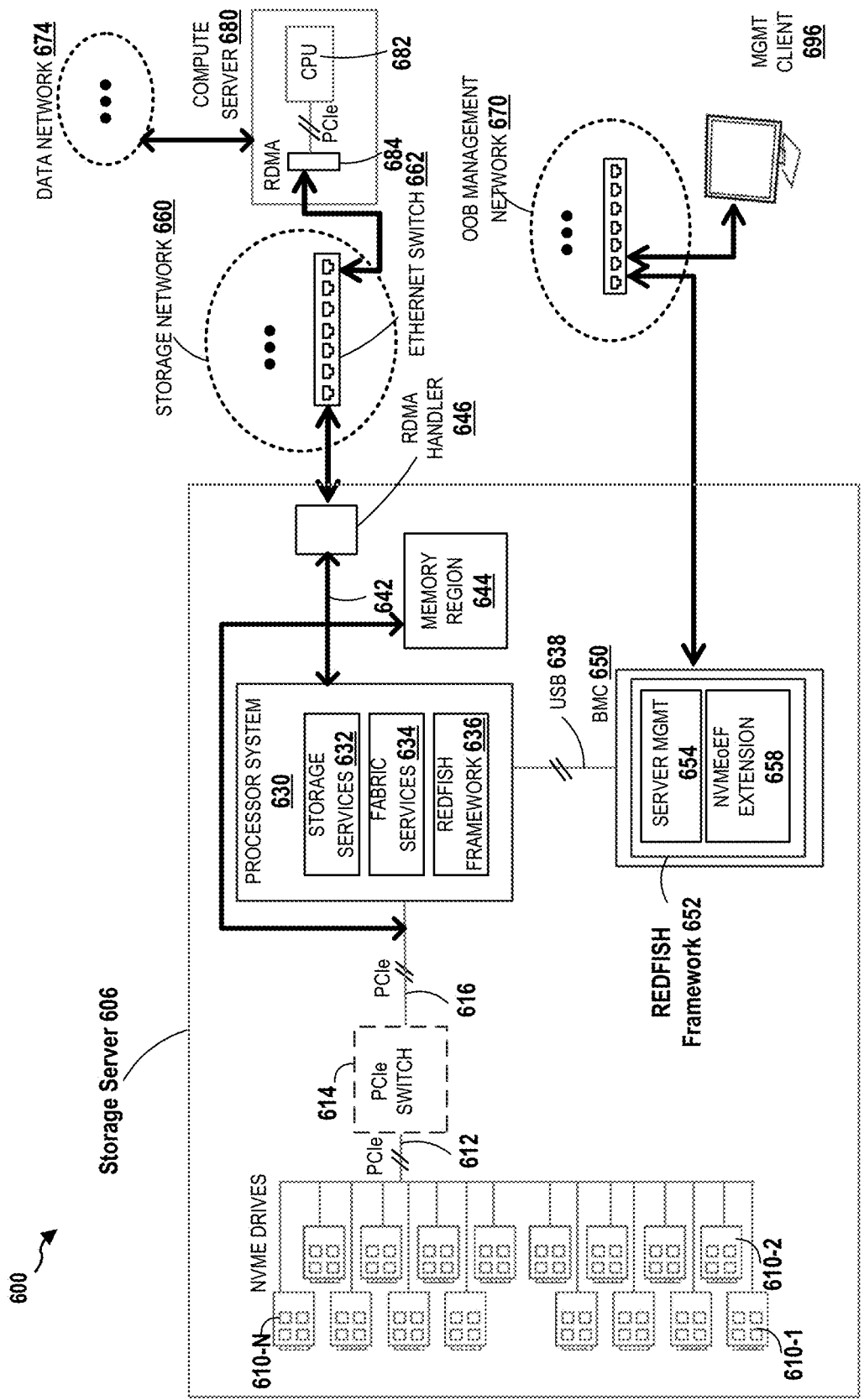
FIG. 6 is a diagram illustrating a computer system.

FIG. 6 is a diagram illustrating a computer system 600. In the computer system 600, a storage device 606 has, among other components, a processor system 630 and NVME drives 610-1 . . . 610-N. In this example, the processor system 630 is in communication with the NVME drives 610-1 . . . 610-N through a PCIe link 612. Further, when the number of the NVME drives 610-1 . . . 610-N is greater than the number of drives supported by the chipset of the processor system 630, a PCIe switch 614 may be employed between the NVME drives 610-1 . . . 610-N and the processor system 630 such that the NVME drives 610-1 . . . 610-N can be connected to the processor system 630.

The processor system 630 also has an RDMA handler 646, which is in communication with the processor system 630, the PCIe link 612, and a memory region 644 of a memory at the storage device 606 through a communication link 642. The RDMA handler 646 provides RDMA functionalities for storing user data to the NVME drives 610-1 . . . 610-N and for accessing user data stored on the NVME drives 610-1 . . . 610-N. For example, the RDMA handler 646 may, according to the instructions from the compute server 680, directly (without going through the processor system 630) transfer data from the memory region 644 to a remote memory region at the compute server 680 and/or write data from the remote memory region to the memory region 644. Further, the RDMA handler 646 may, according to the instructions of the processor system 630, directly (without going through the processor system 630) transfer data between the NVME drives 610-1 . . . 610-N and the memory region 644.

Further, the processor system 630 executes storage services 632, fabric services 634, and a REDFISH framework 636 for managing, among other functions, the storage device 606. The storage services 632, the fabric services 634, and the REDFISH framework 636 may be PSME services as described supra referring to FIGS. 1 to 5. The storage services 632 and the fabric services 634 on the processor system 630 may use Storage Performance Development Kit (SPDK) framework on a standard Linux server OS to perform all Storage and Fabric operations. The storage services 632 manages and configures the NVME drives 610-1 . . . 610-N and the RDMA handler 646. For example, the storage services 632 may allocate the NVME drives 610-1 . . . 610-N to different applications. The storage services 632 may also configures the RDMA handler 646 to provide RDMA functions and configures the memory region 644 that is for use by one or more applications during RDMA procedures. The fabric services 634 manages and configures the fabric (connections), e.g., the PCIe link 612, used for connecting the processor system 630 and the NVME drives 610-1 . . . 610-N.

In this example, a BMC 650 is in communication with the processor system 630 and manages the storage device 606. The BMC 650 may be the BMC 252 and/or the BMC 502. In particular, the BMC 650 may be connected to the storage device 606 through a LAN over USB link 638. Further, the communication between the BMC 650 and the storage device 606 may be based on LAN over USB protocols. The BMC 650 includes, among other components, a server management component 654 and a NVMEofEF extension 658. NVME stands for NVME over Ethernet Fabric. Further, the BMC 650 is in communication with a client 696 through a management network 670.

The NVMEofEF extension 658 enables the out-of-band path through the management network 670 to the storage services 632 and the fabric services 634 on the processor system 630. The NVMEofEF extension 658 may act as a proxy to the storage services 632 running on the processor system 630. The BMC 650 continues to use its OOB LAN management channel over the management network 670 to also offer OOB NVME storage manageability over Ethernet. To the external Orchestration/Management software, the same IP address on the management network 670 is visible as an OOB point for server management (default BMC functions) and storage management of the storage device 606.

A compute server 680 can access the storage device 606 through a storage network 660 including one or more ethernet switches 662. The CPU 682 includes, among other components, a CPU 682 and a RDMA component 684, which are in communication with each other through a PCIe link. The RDMA component 684 may send commands to the RDMA handler 646 to read data from and write data to the memory region 644. The data in the memory region 644 may be stored on, or obtained from, the NVME drives 610-1 . . . 610-N by the RDMA handler 646 and/or the processor system 630. In this example, RDMA based network connectivity is used to establish the storage network 660.

In certain configurations, the BMC 650 includes a BMC REDFISH framework 652. Further, a server management component 654 and a NVMEofEF extension 658 are running on the BMC REDFISH framework 652. In one example, a management application on the client 696 may send to the BMC 650 a REDFISH message directed to the NVMEofEF extension 658, the REDFISH message containing a service management command to be executed at the storage services 632 and/or the fabric services 634. Upon receiving the REDFISH message at the BMC REDFISH framework 652, a message handler at the BMC REDFISH framework 652 examines the attributes of the message to determine whether the message is intended for the server management component 654 or the NVMEofEF extension 658.

In this example, the message handler determines that the message is directed to the NVMEofEF extension 658 and, accordingly, forwards the REDFISH message to the NVMEofEF extension 658. The NVMEofEF extension 658 further examines attributes of the REDFISH message and determines that the REDFISH message is targeted at the storage services 632. The NVMEofEF extension 658 then may send the REDFISH message to the storage services 632 at the storage device 606 through the LAN over USB link 638 without processing the message data, if the REDFISH message is also compatible with the host REDFISH framework 636. Alternatively, the NVMEofEF extension 658 may extract the content of the REDFISH message (without processing the content) and generate another REDFISH message compatible with the host REDFISH framework 636; subsequently, the NVMEofEF extension 658 sends the generated REDFISH message to the host REDFISH framework 636 (e.g., through the LAN over USB link 638). As described supra, in this example, the processor system 630 is configured to run the host REDFISH framework 636. As such, the host REDFISH framework 636 may be utilized for communication with the storage services 632 and the fabric services 634.

Upon receiving the REDFISH message, the host REDFISH framework 636 determines the destination of the message. In this example, the destination of the message is the storage services 632. Accordingly, the host REDFISH framework 636 extracts the content (e.g., the service management command) of the message and sends the content to the storage services 632. The storage services 632 determines that the content is a service management command and executes the service management command. For example, the service management command may be for configuring the NVME drives 610-1 . . . 610-N. The service management command may be for configuring the RDMA handler 646. The storage services 632 executes the service management command and configures the NVME drives 610-1 . . . 610-N as instructed.

In another example, the host REDFISH framework 636 determines that the destination is the fabric services 634. Accordingly, the host REDFISH framework 636 extracts the content (e.g., the service management command) of the REDFISH message and sends the content to the fabric services 634. The fabric services 634 determines that the content is a service management command and executes the service management command. For example, the service management command may be for configuring the PCIe link 612 and/or the PCIe switch 614.

In yet another example, the message handler determines that the REDFISH message is directed to the server management component 654 and, accordingly, forwards the REDFISH message to the server management component 654. The BMC 650 is similar to the BMC 502 and the storage device 606 is a host of the BMC 502 and similar to the host computer/PSME 580. In other words, the server management component 654 performs the baseboard management functions described supra regarding the BMC 502 and as specified in IPMI Specifications. Upon receiving the REDFISH message, the server management component 654 extracts a baseboard management command from the baseboard management command. For example, the baseboard management command may be for retrieving sensor data stored at the BMC 650. The server management component 654 retrieves the sensor data and sends the sensor data back to the client 696 through the management network 670. In another example, the baseboard management command may be targeted to a component at the storage device 606 (i.e., the host). The baseboard management command may be for getting a sensor reading directly from the processor system 630. Accordingly, the server management component 654 sends the baseboard management command to the processor system 630 through the LAN over USB link 638 (or other communication channels between a BMC and its host as described supra).

Further, the compute server 680 is connected to a data network 674, through which the compute server 680 may be in communication with other compute servers and/or the Internet.

In certain configurations, the storage network 660 is only used for transmitting data for use by the compute server 680. In particular, the storage network 660 may only be used to implement the RDMA data transfers. Data and commands for management of the fabric services 634, storage services 632, and the host REDFISH framework 636 are communicated to the storage device 606 via the management network 670 and the BMC 650.

In certain configurations, any two or all of the data network 674, the management network 670, and the storage network 660 are isolated with each other.

The techniques may enable "Server SAN" functions on a storage server and appliance, without any change in the storage management software. Extra hardware infrastructure may not be needed to manage NVME storage pool. An extra network interface in the storage appliance may not be needed. The existing management LAN to the BMC is used to enable out-of-band (OOB) "Server SAN" function. The techniques are based on proven RDMA technology. The techniques enable a quick deployment of "NVME over Ethernet Fabric" support using software-only changes on an already deployed NVME storage server or appliance hardware. The implementation is scalable and can be multiplied to handle the need for extra storage in the future. The techniques can be applied at different levels of storage pool installation: data center or enterprise.

Figure 7:
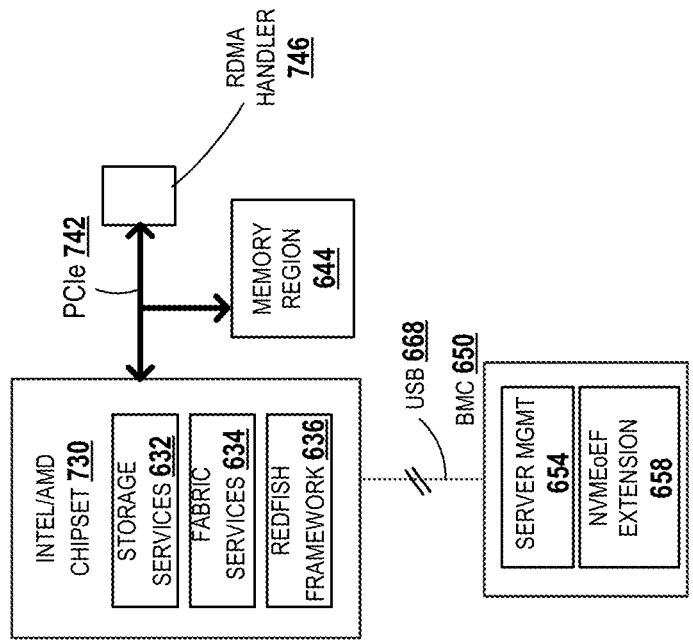
FIG. 7 is a diagram illustrating a particular implementation of the processing system.

FIG. 7 is a diagram 700 illustrating a particular implementation of the processor system 630. In this implementation, the processor system 630 is an INTEL/AMD chipset 730 having, for example, a X86 or X64 architecture. A RDMA handler 746 is in communication with the INTEL/AMD chipset 730 through a PCIe communication link 742. The storage services 632 and the fabric services 634 executed on the INTEL/AMD chipset 730 provide NVMEoEF services. The storage services 632, the fabric services 634, the host REDFISH framework 636, the server management component 654, the NVMEofEF extension 658, the memory region 644, and the RDMA handler 746 operate as what was described supra referring to FIG. 6.

Figure 8:
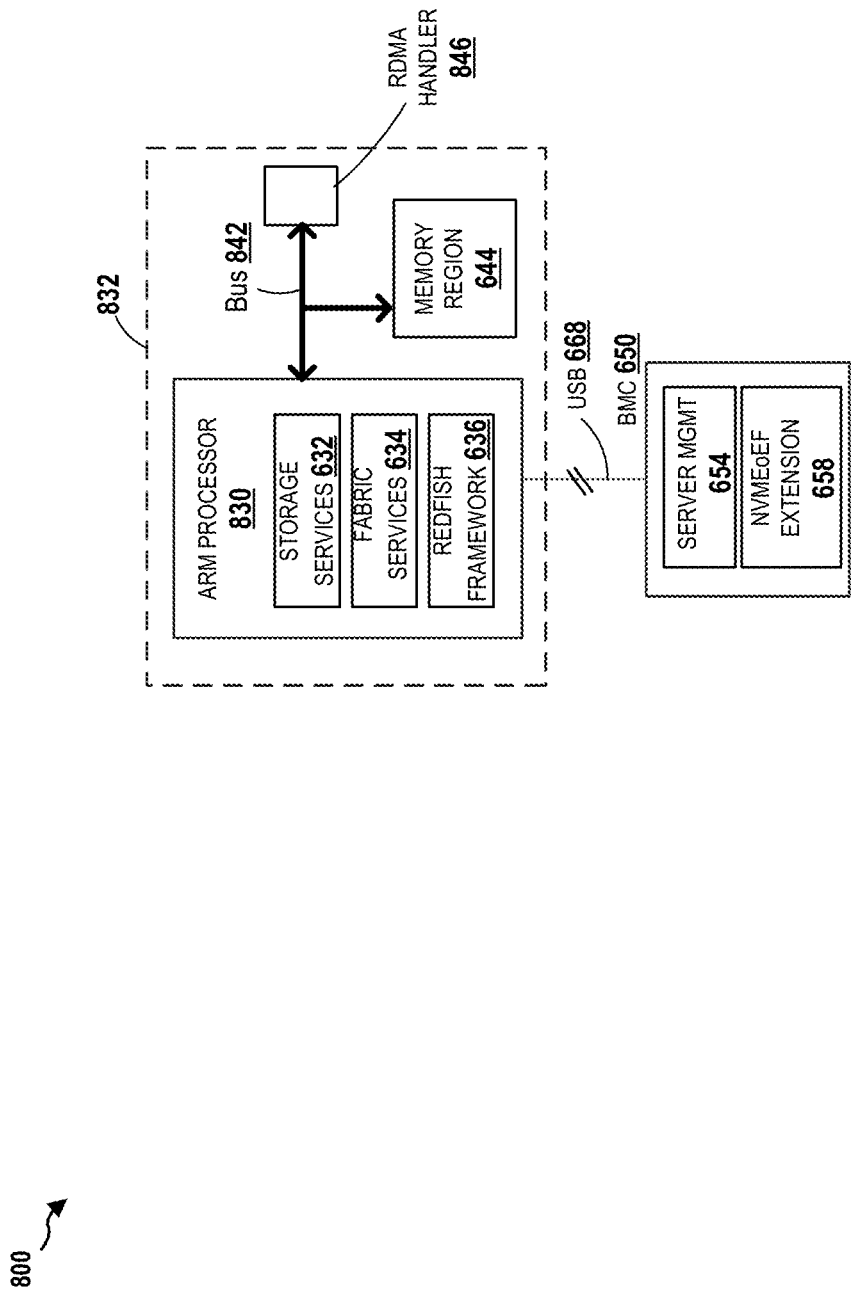
FIG. 8 is a diagram illustrating a particular implementation of the processing system.

FIG. 8 is a diagram 800 illustrating a particular implementation of the processor system 630. In this implementation, the processor system 630 is an ARM processor 830. An ARM processor is one of a family of CPUs based on the RISC (reduced instruction set computer) architecture developed by Advanced RISC Machines (ARM). ARM makes 32-bit and 64-bit RISC multi-core processors. RISC processors are designed to perform a smaller number of types of computer instructions so that they can operate at a higher speed, performing more millions of instructions per second (MIPS). By stripping out unneeded instructions and optimizing pathways, RISC processors provide outstanding performance at a fraction of the power demand of CISC (complex instruction set computing) devices.

Further, the ARM processor 830 may be a part of an integrated storage controller 832 that also includes an RDMA handler 846 and the memory region 644. The ARM processor 830 is a primary processing unit of the storage controller 832. The RDMA handler 846 may be in communication with the ARM processor 830 through an internal bus 842. The storage services 632 and the fabric services 634 executed on the ARM processor 830 provide NVMEoEF services. The storage services 632, the fabric services 634, the host REDFISH framework 636, the server management component 654, the NVMEofEF extension 658, the memory region 644, and the RDMA handler 846 operate as what was described supra referring to FIG. 6.

The techniques disclosed here may enable "NVME over Ethernet Fabric" function on standard, readily available commodity NVME storage server box. This pooled storage is to serve a large number of consumers, within the enterprise, or at the data center level. The techniques disclosed here may provide the storage system security. The techniques disclosed here may apply the same level of security/safety provisions at different levels of infrastructure installations: data centers or local enterprise. The techniques disclosed here may be applied to all storage boxes (servers and appliances). The techniques disclosed here may not require hardware changes in already available storage servers, for enabling fully secured "NVME over Ethernet Fabric" functions. Implementation of the techniques disclosed here may not affect the existing "Server Management" functions running on an onboard BMC chip.

As described supra, the BMC 650 and the processor system 630 may communicate through the LAN over USB link 638. The NVMEofEF extension 658 on the BMC 650 serves all the storage management calls intended for the NVMEoEF services (e.g., the storage services 632, the fabric services 634) running on the storage device 606. BMC firmware (e.g., the NVMEofEF extension 658) acts as a proxy for the storage services 632 and the fabric services 634. The existing management network 670 is used for regular BMC communication, as well as for "Server SAN" management access (e.g., management functions and calls directed to the storage services 632 and the fabric services 634).

Although the client 696 on the management network 670 can send management commands to the storage services 632 and the fabric services 634 through the NVMEofEF extension 658 and the host REDFISH framework 636, the management network 670 is isolated from the storage network 660 and the client 696 cannot access data stored on the NVME drives 610-1 . . . 610-N through Sever SAN. There is no access from the management network 670 to the storage network 660 (e.g., "Server SAN" functions and data access provided by the storage device 606). The only connectivity to a "Server SAN" node/target (e.g., the storage device 606) is through the isolated storage network 660. In certain configurations, as there is no direct out-of-band connectivity into the storage target (e.g., the storage device 606), the storage device 606 may be secured from any external/network vulnerabilities/attacks.

Referring to FIG. 6, management applications on the client 696 can only access the storage device 606 through the management network 670 through the NVMEofEF extension 658 at the BMC 650 and the LAN over USB link 638 between the BMC 650 and the storage device 606. In certain configurations, storage servers running on the storage device 606 (or other targets) cannot be accessed from the management network 670. The BMC firmware (e.g., the NVMEofEF extension 658) ensures that only applicable "Server SAN" management calls are routed to the storage services 632 and/or the fabric services 634 via the internal LAN over USB link 638. For example, when the host REDFISH framework 636 receives a message from the BMC 650 through the LAN over USB link 638, the host REDFISH framework 636 determines whether the message includes only commands for managing the storage services 632 and/or the fabric services 634. When the host REDFISH framework 636 the message includes commands for accessing or operating the RDMA handler 646, the host REDFISH framework 636 may discard the message and/or those commands. That is, the host REDFISH framework 636 does not provide access to the storage network 660 from the management network 670.

The techniques disclosed here may not need for any extra security/safety measures/software at the "Storage Box" level. With no "storage management channel" into the "Server SAN" stack, the hardware design remains simple, and unchanged. With no "storage management channel" into the "Server SAN" stack, the complexity to deploy, and manage the box reduces tremendously. The techniques disclosed here may result into cost savings.

Figure 9:
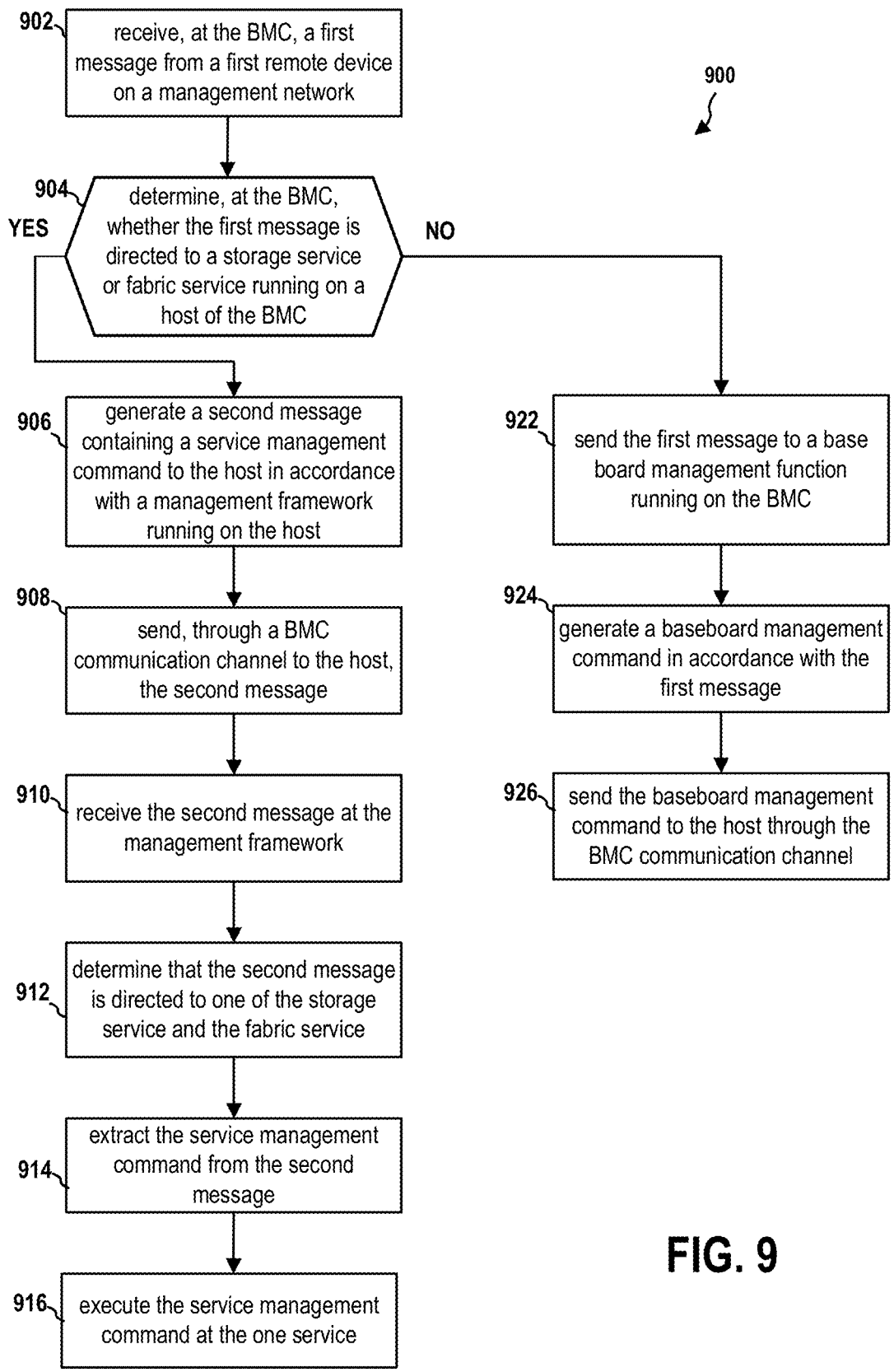
FIG. 9 is a flow chart of a method (process) for managing a Server SAN.

FIG. 9 is a flow chart 900 of a method (process) for managing a Server SAN. The method may be performed by a computer system including a BMC (e.g., BMC 650) and a host (e.g., the storage device 606) of the BMC. In certain configurations, at operation 902, the BMC receives a first message from a first remote device on a management network. At operation 904, the BMC determines whether the first message is directed to a storage service or fabric service executed on a central processing unit of the host. The host is a storage device. The central processing unit is in commutation with an RDMA controller through an external communication channel. The RDMA controller being managed by the storage service.

In certain configurations, the external communication channel is a Peripheral Component Interconnect Express (PCIe) link between a chip set of the central processing unit and the RDMA controller. The fabric service manages a fabric connecting one or more drives to the chip set of the central processing unit. The fabric includes one or more PCIe links.

When the first message is directed to the storage service or fabric service, at operation 906, the BMC extracts a service management command from the first message and generates the second message containing the service management command to the host in accordance with a management framework running on the host. At operation 908, the BMC sends, through a BMC communication channel to the host, the second message. The BMC communication channel has been established for communicating baseboard management commands between the BMC and the host.

At operation 910, the host receives the second message at the management framework. At operation 912, the host determines that the second message is directed to one of the storage service and the fabric service. At operation 914, the host extracts the service management command from the second message. At operation 916, the host executes the service management command at the one service.

When the first message is not directed to the storage service or fabric service running on the host, at operation 922, the BMC sends the first message to a base board management function running on the BMC. At operation 924, the BMC generates a baseboard management command in accordance with the first message. At operation 926, the BMC sends the baseboard management command to the host through the BMC communication channel.

In certain circumstances, the host receives, at a Remote Direct Memory Access (RDMA) controller of the host managed by the storage service, a data operation command from a remote device through a storage network. The RDMA controller (a) retrieves, through the external communication channel, user data associated with the data operation command from a memory region of the host and sends the user data to the remote device through the storage network without passing through the central processing unit, or, (b) receives the user data associated with the data operation command through the storage network and writing, through the external communication channel, the user data to the memory region without passing through the central processing unit.

In certain circumstances, the central processing unit retrieves the user data from one or more storage drives connected to the host via the fabric service. In certain circumstances, the central processing unit writes the user data to the memory region prior to the retrieving the user data from the memory region.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating a computer system, the computer system including a baseboard management controller (BMC) and a host of the BMC, comprising:
   receiving, at the BMC, a first message from a first remote device on a management network;
   determining, at the BMC, whether the first message is directed to a storage service or fabric service executed on a central processing unit of the host, the host being a storage device, the central processing unit being in commutation with a Remote Direct Memory Access (RDMA) controller through an external communication channel, the RDMA controller being managed by the storage service;
   extracting a service management command from the first message, when the first message is directed to the storage service or fabric service; and
   sending, through a BMC communication channel to the host, a second message containing the service management command to the host, the BMC communication channel established for communicating baseboard management commands between the BMC and the host.

2. The method of claim 1, wherein the external communication channel is a Peripheral Component Interconnect Express (PCIe) link between a chip set of the central processing unit and the RDMA controller.

3. The method of claim 1, wherein the fabric service manages a fabric connecting one or more drives to the chip set of the central processing unit.

4. The method of claim 3, wherein the fabric includes one or more PCIe links.

5. The method of claim 1, further comprising:
   generating the second message in accordance with a management framework running on the host.

6. The method of claim 5, wherein the computer system further includes the host, the method further comprising:
   receiving the second message at the management framework;
   determining that the second message is directed to one of the storage service and the fabric service;
   extracting the service management command from the second message; and
   executing the service management command at the one service.

7. The method of claim 6, further comprising:
   receiving, at the RDMA controller, a data operation command from a remote device through a storage network; and
   (a) retrieving, by the RDMA controller and through the external communication channel, user data associated with the data operation command from a memory region of the host and sending the user data to the remote device through the storage network without passing through the central processing unit, or, (b) receiving, by the RDMA controller, the user data associated with the data operation command through the storage network and writing, by the RDMA and through the external communication channel, the user data to the memory region without passing through the central processing unit.

8. The method of claim 7, further comprising:
   retrieving, by the central processing unit, the user data from one or more storage drives connected to the host via the fabric service; and
   writing, by the central processing unit, the user data to the memory region prior to the retrieving the user data from the memory region.

9. The method of claim 1, further comprising:
   sending the first message to a base board management function running on the BMC, when the first message is not directed to the storage service or fabric service running on the host.

10. The method of claim 9, further comprising:
    generating a baseboard management command in accordance with the first message; and sending the baseboard management command to the host through the BMC communication channel.

11. A computer system, comprising:
a baseboard management controller (BMC), including:
   a first memory, and
   first at least one processor coupled to the memory; and
a host of the BMC, including:
   a second memory,
   a central processing unit; and
   a Remote Direct Memory Access (RDMA) controller;
wherein the first at least one processor is further configured to:
   receive, at the BMC, a first message from a first remote device on a management network;
   determine, at the BMC, whether the first message is directed to a storage service or fabric service executed on the central processing unit of the host, the host being a storage device, the central processing unit being in commutation with the RDMA controller through an external communication channel, the RDMA controller being managed by the storage service;
   extract service management command from the first message, when the first message is directed to the storage service or fabric service; and
   send, through a BMC communication channel to the host, a second message containing the service management command to the host, the BMC communication channel established for communicating baseboard management commands between the BMC and the host.

12. The computer system of claim 11, wherein the external communication channel is a Peripheral Component Interconnect Express (PCIe) link between a chip set of the central processing unit and the RDMA controller.

13. The computer system of claim 11, wherein the fabric service manages a fabric connecting one or more drives to the chip set of the central processing unit.

14. The computer system of claim 13, wherein the fabric includes one or more PCIe links.

15. The computer system of claim 11, wherein the first at least one processor is further configured to:
   generate the second message in accordance with a management framework running on the host.

16. The computer system of claim 15, wherein the central processing unit is further configured to:
   receive the second message at the management framework;
   determine that the second message is directed to one of the storage service and the fabric service;
   extract the service management command from the second message; and
   execute the service management command at the one service.

17. The computer system of claim 16, wherein the RDMA controller is further configured to:
   receive, at the RDMA controller, a data operation command from a remote device through a storage network; and
   (a) retrieve, by the RDMA controller and through the external communication channel, user data associated with the data operation command from a memory region of the host and send the user data to the remote device through the storage network without passing through the central processing unit, or, (b) receive, by the RDMA controller, the user data associated with the data operation command through the storage network and write, by the RDMA and through the external communication channel, the user data to the memory region without passing through the central processing unit.

18. The computer system of claim 17, wherein the central processing unit is further configured to:
   retrieve, by the central processing unit, the user data from one or more storage drives connected to the host via the fabric service; and
   write, by the central processing unit, the user data to the memory region prior to the retrieving the user data from the memory region.

19. The computer system of claim 11, wherein the first at least one processor is further configured to:
   sending the first message to a base board management function running on the BMC, when the first message is not directed to the storage service or fabric service running on the host.

20. A non-transitory computer-readable medium storing computer executable code for operating a computer system, the computer system including a baseboard management controller (BMC) and a host of the BMC, comprising code to:
   receive, at the BMC, a first message from a first remote device on a management network;
   determine, at the BMC, whether the first message is directed to a storage service or fabric service executed on a central processing unit of the host, the host being a storage device, the central processing unit being in commutation with a Remote Direct Memory Access (RDMA) controller through an external communication channel, the RDMA controller being managed by the storage service;
   extract a service management command from the first message, when the first message is directed to the storage service or fabric service; and
   send, through a BMC communication channel to the host, a second message containing the service management command to the host, the BMC communication channel established for communicating baseboard management commands between the BMC and the host.

* * * * *